(12) United States Patent
Kudelski et al.

(10) Patent No.: US 11,977,666 B2
(45) Date of Patent: *May 7, 2024

(54) FLEXIBLE CRYPTOGRAPHIC DEVICE

(71) Applicant: NAGRAVISION SARL, Cheseaux-sur-Lausanne (CH)

(72) Inventors: Andre Kudelski, Cheseaux-sur-Lausanne (CH); Nicolas Fischer, Cheseaux-sur-Lausanne (CH); Jerome Perrine, Cheseaux-sur-Lausanne (CH)

(73) Assignee: NAGRAVISION SARL, Cheseaux-sur-Lausanne (CH)

( * ) Notice: Subject to any disclaimer, the term of this patent is extended or adjusted under 35 U.S.C. 154(b) by 59 days.

This patent is subject to a terminal disclaimer.

(21) Appl. No.: 17/746,564

(22) Filed: May 17, 2022

(65) Prior Publication Data
US 2022/0391544 A1 Dec. 8, 2022

Related U.S. Application Data

(63) Continuation of application No. 16/078,588, filed as application No. PCT/EP2017/058407 on Apr. 7, 2017, now Pat. No. 11,366,936.

(30) Foreign Application Priority Data

Apr. 7, 2016 (GB) ...................... 1605974

(51) Int. Cl.
*G06F 21/76* (2013.01)
*G06F 21/57* (2013.01)
(Continued)

(52) U.S. Cl.
CPC ............ *G06F 21/76* (2013.01); *G06F 21/572* (2013.01); *G06F 21/64* (2013.01); *G06F 21/73* (2013.01);
(Continued)

(58) Field of Classification Search
CPC ........ G06F 21/76; G06F 21/572; G06F 21/64; G06F 21/77; H04L 9/3278
See application file for complete search history.

(56) References Cited

U.S. PATENT DOCUMENTS

| | | | | |
|---|---|---|---|---|
| 4,534,014 A | * | 8/1985 | Ames ..................... | G11C 17/14 365/100 |
| 4,701,636 A | * | 10/1987 | Millhollan ............. | G11C 17/18 327/540 |

(Continued)

OTHER PUBLICATIONS

European Office Action dated Oct. 2, 2020 in Patent Application No. 17 717 650.0, 8 pages.
(Continued)

*Primary Examiner* — Jason Chiang
(74) *Attorney, Agent, or Firm* — Oblon, McClelland, Maier & Neustadt, L.L.P.

(57) ABSTRACT

A method of programming a device comprising acquiring configuration data, loading the configuration data onto a programmable device, processing at least a portion of the configuration data through a one way function to form processed configuration data, and configuring at least one configurable module of the programmable device using the processed configuration data from the processing step.

13 Claims, 4 Drawing Sheets

(51) Int. Cl.

| | | |
|---|---|---|
| *G06F 21/64* | (2013.01) | |
| *G06F 21/73* | (2013.01) | |
| *G06F 21/77* | (2013.01) | |
| *G06F 30/34* | (2020.01) | |
| *H04L 9/08* | (2006.01) | |
| *H04L 9/32* | (2006.01) | |

(52) U.S. Cl.
CPC ............. *G06F 21/77* (2013.01); *G06F 30/34* (2020.01); *H04L 9/0866* (2013.01); *H04L 9/3278* (2013.01); *H04L 9/32* (2013.01)

(56) References Cited

U.S. PATENT DOCUMENTS

| | | | | |
|---|---|---|---|---|
| 4,992,680 | A * | 2/1991 | Benedetti | H03K 19/17708 326/39 |
| 5,128,871 | A * | 7/1992 | Schmitz | G06F 30/34 716/117 |
| 6,442,675 | B1 * | 8/2002 | Derrick | G06F 9/30043 712/225 |
| 6,785,816 | B1 * | 8/2004 | Kivimaki | H04L 63/123 713/181 |
| 7,408,381 | B1 * | 8/2008 | Drimer | G06F 30/34 326/38 |
| 7,535,249 | B1 * | 5/2009 | Knapp | G06F 21/572 326/8 |
| 7,746,099 | B1 * | 6/2010 | Chan | H03K 19/17756 326/38 |
| 7,809,544 | B1 * | 10/2010 | Trimberger | G06F 30/331 716/128 |
| 8,205,180 | B1 * | 6/2012 | Anderson | G06F 30/392 716/108 |
| 8,248,869 | B1 * | 8/2012 | Chan | G11C 7/1012 365/194 |
| 8,415,974 | B1 * | 4/2013 | Lysaght | H03K 19/17756 326/39 |
| 8,583,944 | B1 * | 11/2013 | Trimberger | G06F 11/3058 713/340 |
| 8,667,265 | B1 * | 3/2014 | Hamlet | H04L 9/0866 713/185 |
| 8,924,455 | B1 * | 12/2014 | Barman | G06F 7/5443 708/607 |
| 9,305,185 | B1 * | 4/2016 | Pedersen | G06F 21/575 |
| 9,331,848 | B1 * | 5/2016 | Pedersen | H04L 9/0637 |
| 9,397,835 | B1 * | 7/2016 | Campagna | H04L 9/0825 |
| 9,876,645 | B1 * | 1/2018 | Ramalingam | G06F 21/57 |
| 10,177,922 | B1 * | 1/2019 | Hamlet | H04L 9/3278 |
| 10,262,161 | B1 * | 4/2019 | McClintock | G06F 21/52 |
| 2001/0015919 | A1 * | 8/2001 | Kean | G06F 21/76 711/E12.092 |
| 2001/0037458 | A1 * | 11/2001 | Kean | G06F 21/76 713/193 |
| 2002/0045952 | A1 * | 4/2002 | Blemel | G05B 19/042 700/2 |
| 2003/0057996 | A1 * | 3/2003 | Lasselet Goldfinch | G06F 30/34 326/37 |
| 2003/0140221 | A1 * | 7/2003 | Garnett | G06F 9/44505 713/1 |
| 2006/0059574 | A1 * | 3/2006 | Fayad | H03K 19/17768 726/34 |
| 2006/0206727 | A1 * | 9/2006 | Wasson | G06F 21/10 713/189 |
| 2007/0198779 | A1 | 8/2007 | Wang | |
| 2009/0119503 | A1 * | 5/2009 | Isaakian | G06F 21/572 713/153 |
| 2010/0246819 | A1 * | 9/2010 | Candelore | H04N 21/8186 380/42 |
| 2013/0254636 | A1 * | 9/2013 | Kirkpatrick | H04L 9/0866 714/752 |
| 2014/0098953 | A1 * | 4/2014 | Dellow | H04L 9/0861 380/44 |
| 2015/0026471 | A1 * | 1/2015 | Cha | G06F 21/57 713/168 |
| 2015/0082048 | A1 | 3/2015 | Ferguson et al. | |
| 2015/0106776 | A1 * | 4/2015 | Ogami | G06F 9/22 716/117 |
| 2015/0235057 | A1 * | 8/2015 | Simmons | G06F 21/79 713/193 |
| 2015/0339665 | A1 * | 11/2015 | Hayhow | G06Q 20/401 705/71 |
| 2016/0026826 | A1 * | 1/2016 | Kocher | H04L 9/088 713/1 |
| 2017/0063559 | A1 * | 3/2017 | Wallrabenstein | H04L 9/085 |
| 2017/0257222 | A1 * | 9/2017 | Pedersen | G06F 1/26 |
| 2017/0310489 | A1 * | 10/2017 | Van Der Sluis | H04L 9/3278 |

OTHER PUBLICATIONS

"Cubase SE Music Creation and Production System Operation Manual" Steinberg, XP007911758, Jan. 1, 2004, 628 pages.

Extended European Search Report dated Nov. 17, 2021 in European Application No. 21193382.5.

International Search Report and Written Opinion for related PCT Application No. PCT/EP2017/058407, dated Jul. 7, 2017, in 9 pages.

* cited by examiner

FLEXIBLE CRYPTOGRAPHIC DEVICE

CROSS-REFERENCE TO RELATED APPLICATIONS

This application is a continuation of U.S. application Ser. No. 16/078,588, filed Aug. 21, 2018, which is a '371 National Phase of PCT/EP2017/058407, filed Apr. 7, 2017, which claims priority to United Kingdom Patent Application No. 1605974.3, filed Apr. 7, 2016, the entire contents of each of which are hereby incorporated by reference in their entirety.

DESCRIPTION

This disclosure relates to a method of programming a device and a programmable device, more particularly although not exclusively to simplifying the hardware design and manufacture of programmable devices. It is particularly suitable for, but by no means limited to, improving and simplifying the deployment of a secure element, such as on a smart card.

BACKGROUND

Often, data content providers such as pay television or other protected content providers allow access to controlled data by way of, for example, access codes and/or key(s) to encryption/decryption algorithms. In order to protect the keys or other secure access means, devices that deliver access to the controlled data, such as a set-top box or other bespoke hardware can be deployed with a secure element that provides protection against unauthorised access to the secure access means.

It is highly desirable, therefore, for unscrupulous parties to gain access to the information within the secure element in order to circumvent the protection and gain access to the controlled data. As a result, the secure elements are typically designed and fabricated with their security features hardwired at the time of manufacture. This allows a highly secure, but costly deployment of the secure element and makes design change requests and product evolution difficult whilst maintaining security owing to the hardwired security features.

BRIEF DESCRIPTION OF THE DRAWINGS

Embodiments will now be described, by way of example only, and with reference to the drawings in which.

In the Figures, like elements are indicated by like reference numerals throughout.

DETAILED DESCRIPTION OF THE DRAWINGS

Figure 1:
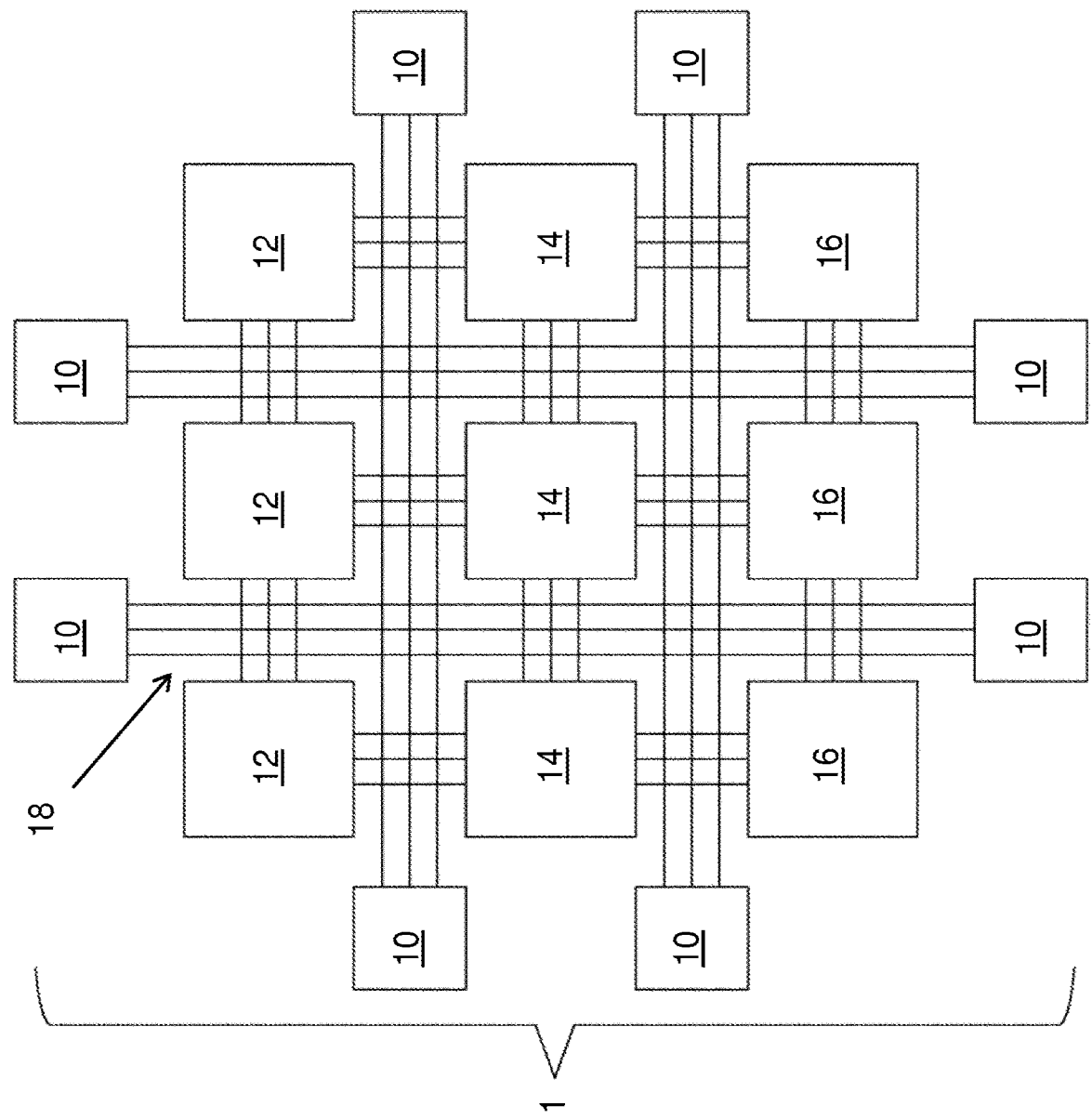
FIG. 1 illustrates a programmable device comprising cryptographic modules.

In some aspects of the disclosure, a method of programming a programmable device is provided that comprises acquiring configuration data, loading the configuration data onto the programmable device, processing at least a portion of the configuration data through a one way function to form processed configuration data and configuring at least one configurable module of the programmable device using the processed configuration data from the processing step. This allows post-manufacture programming of the at least one configurable module in a secure manner, and hence design and fabrication of the programmable device is simplified and less costly whilst maintaining security. In some embodiments, the one way function comprises a hash function which may be a cryptographic hash function.

In some embodiments, the loading step further comprises deciphering of the configuration data, and optionally, the loading step further comprises verifying the authenticity and/or integrity of the configuration data by way of an asymmetric key or a symmetric key. This provides security of the configuration data.

In some embodiments, the loading step comprises loading the configuration data onto a configuration module of the programmable device. The deciphering and/or the verifying may be carried out by the configuration module.

In some embodiments, the configuring step comprises a least one of initialising the programmable device, configuring a configurable module of the programmable device, and configuring an interconnection between modules of the programmable device wherein the modules may be configurable or non-configurable.

In some aspects, a programmable device is arranged to carry out any of the methods as described herein. The programmable device may comprise a one way function and at least one configurable module. The one way function may comprise a hash function which may be a cryptographic hash function. In some embodiments, the programmable device comprises a configuration module and/or a processing module. The programmable device may comprise an FPGA, PLD, CPLD or an anti-fuse device.

In some embodiments, the at least one configurable module comprises a cryptographic module. In some embodiments, the cryptographic module comprises at least one of a substitution box module, a substitution table module, a bit permutation module, a byte permutation module, or a matrix multiplication module. In some embodiments, the cryptographic module comprises a hardener for a true random number generator or a physically unclonable function, 'PUF'.

In some embodiments, the at least one configurable module comprises a programmable state-machine. The programmable device may comprise a secure element. The programmable device may be positioned on a smartcard and/or within a set-top box. In some embodiments, the power consumption while executing the method adheres to smartcard operating parameters and/or the form factor of the programmable device adheres to smartcard parameters.

In some embodiments, any configurable module in the programmable device may be configurable by the method.

FIG. 1 illustrates a programmable device 1 (for example an FPGA, PLD, CPLD, Anti-fuse device or other suitable programmable device). The programmable device comprises at least one IO module 10 for providing inputs and outputs to the other modules of the programmable device, and one or more cryptographic modules comprising one or more of a substitution box/substitution list module 12, a bit/byte permutation module 14 and a matrix multiplication module 16 as would be understood by the skilled person. An interconnection network 18 as shown by the vertical and horizontal lines passes between modules of the programmable device. As would be understood, FIG. 1 is an example. Any combination of IO modules 10, other modules 12, 14, 16, and interconnection network could be deployed.

Figure 2:
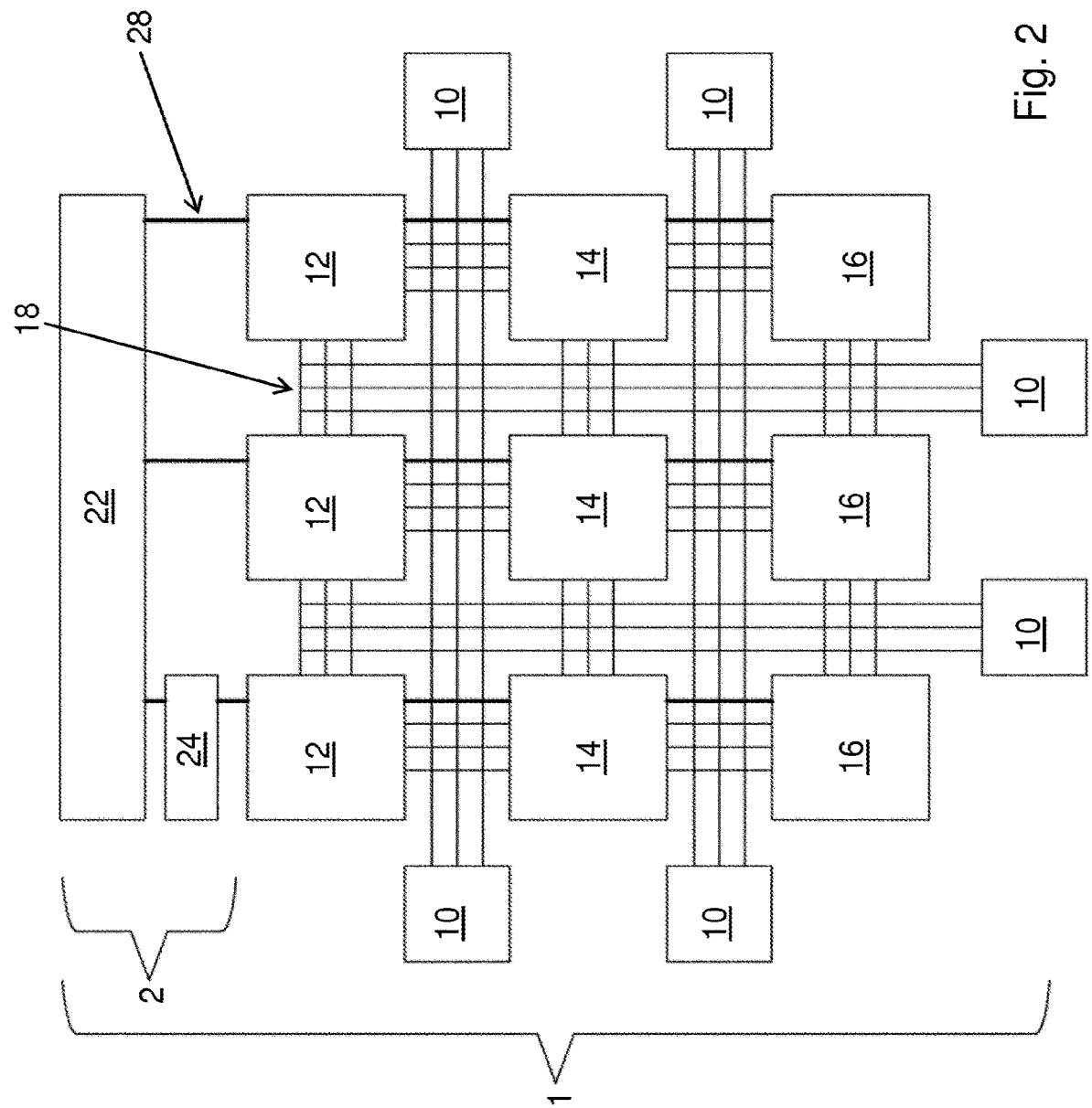
FIG. 2 illustrates a programmable device including a configuration module according to an embodiment.

Turning to FIG. 2, it can be seen that at least one of the IO modules 10 as shown in FIG. 1 may comprise a decrypt and verify module 22 and a processing module 24 which may be considered to be part of a configuration module 2. Modules 22 and 24 may be part of the same physical module on programmable device 1.

As also shown in FIG. 2, interconnection network 18 passes between modules of the programmable device. At least one of the modules 10, 12, 14, 16, and/or at least a subset 28 of any of the interconnection network 18 as shown by the thicker lines (by way of example) may be configured using configuration module 2. Any of the modules of the programmable device are capable of being configured by way of configuration module 2. Hence, programmable device 1 may be considered to comprise a flexible cryptographic device.

Figure 3:
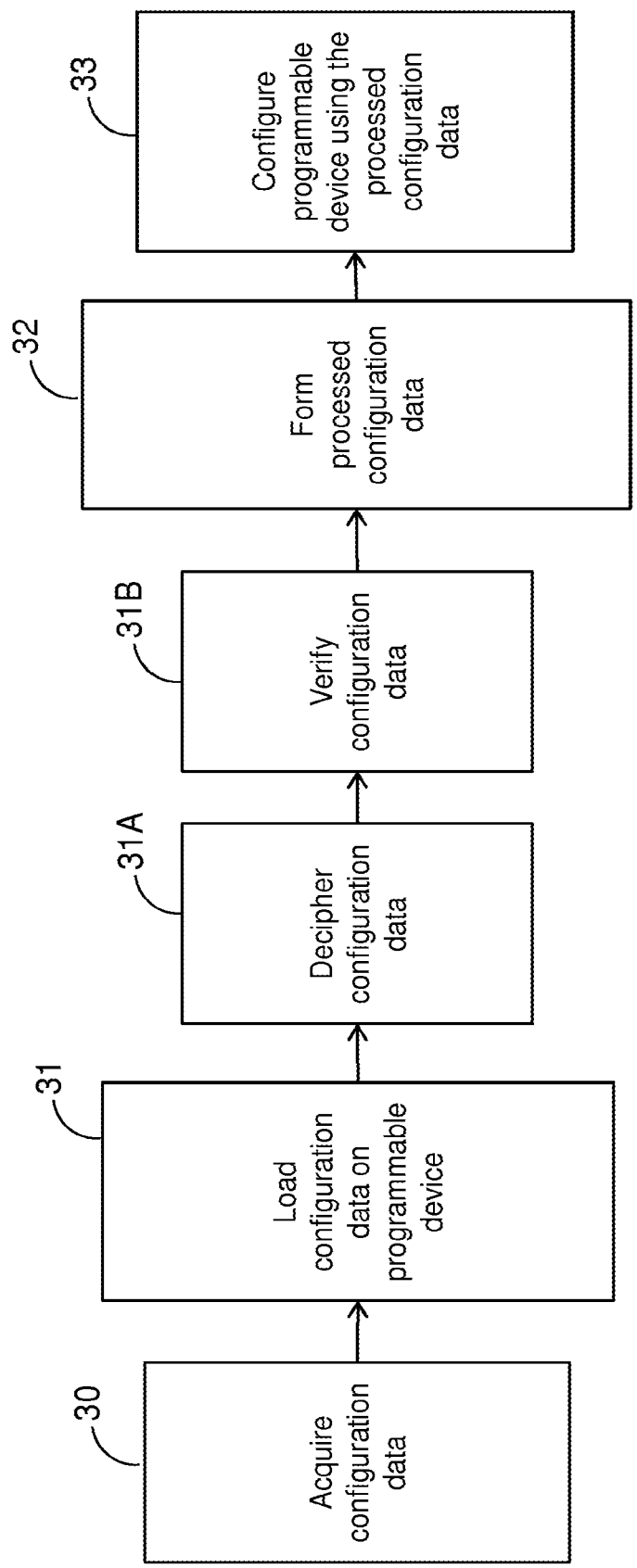
FIG. 3 illustrates a method according to an embodiment.

With reference to FIG. 3, a method will now be described in which at least one module of the programmable device may be configured in a secure manner. In a first step (30), configuration data is acquired, and then loaded (step 31) onto programmable device 1 by way of any suitable means available on the programmable device 1 in question. After loading, the configuration data may reside on a configuration module 2 of device 1. In particular the configuration data may reside in a decrypt and verify module 22. The configuration data may be deciphered (step 31A) by module 22. The authenticity (ensuring data is from a trusted source) and/or integrity (ensuring data has not been modified and/or corrupted) of the configuration data may be verified (step 31B) by module 22 by way of at least one asymmetric or symmetric key or a combination thereof as would be understood. Verification may occur before or after deciphering.

After the optional deciphering and verifying, at least a portion of the configuration data is then processed in step 32 by processing module 24 to form processed configuration data. Processing module 24 comprises a one-way function that is operable on the configuration data to provide the processed configuration data. The one way function is a function whereby it is straight forward to compute the output given the input, but given an output, it is difficult to compute the input. That is to say that it is difficult to compute the inverse function of the one way function, and preferably, the inverse function cannot be computed.

Processing step 32 may be carried out before or after any deciphering and/or verification of steps 31A and 31B.

At step 33, at least one configurable module (10, 12, 14, 16) of programmable device 1 is configured using the processed configuration data. The configurable module may comprise a cryptographic module such as at least one of a substitution box module, a substitution table module, a bit permutation module, a byte permutation module, or a matrix multiplication module. The configurable module may also comprise a hardener for a true random number generator or a physically unclonable function, 'PUF' and/or a flexible state-machine, or any portion of the interconnection network (28 of FIG. 2).

Configuring by way of the processed configuration data may comprise at least one of:

initialising the programmable device 1, whereby internal building blocks, for example flip-flops, of one or more configurable modules of the programmable device 1 are initialised.

configuring a configurable module of the programmable device, for example configuration of cryptographic modules such as substitution boxes, bit permutations, or flexible state-machines, or arithmetic operations such as matrix multiplication, multiply or addition, and/or other modules such as linear feedback shift registers.

configuring an interconnection between modules of the programmable device. The interconnection between configurable or non-configurable modules of the programmable device 1 may be configured. This may include making, breaking or joining interconnections between any of the modules of the programmable device 1.

Additionally, or alternately, configuring may comprise generating elements by the one way function such as a constant value impacting the behaviour of a configurable module such as a cryptographic module by acting as segmentation elements, initialization vectors, pseudo-random permutations, static keys for example. The output of the one way function may also be combined with other configuration elements that are chosen such that the resulting output matches an expected value.

Some modules of the programmable device 1 may be configured by way of configuration data that has not been processed by processing module 24.

After step 33, the programmable device 1 is securely configured.

Figure 4:
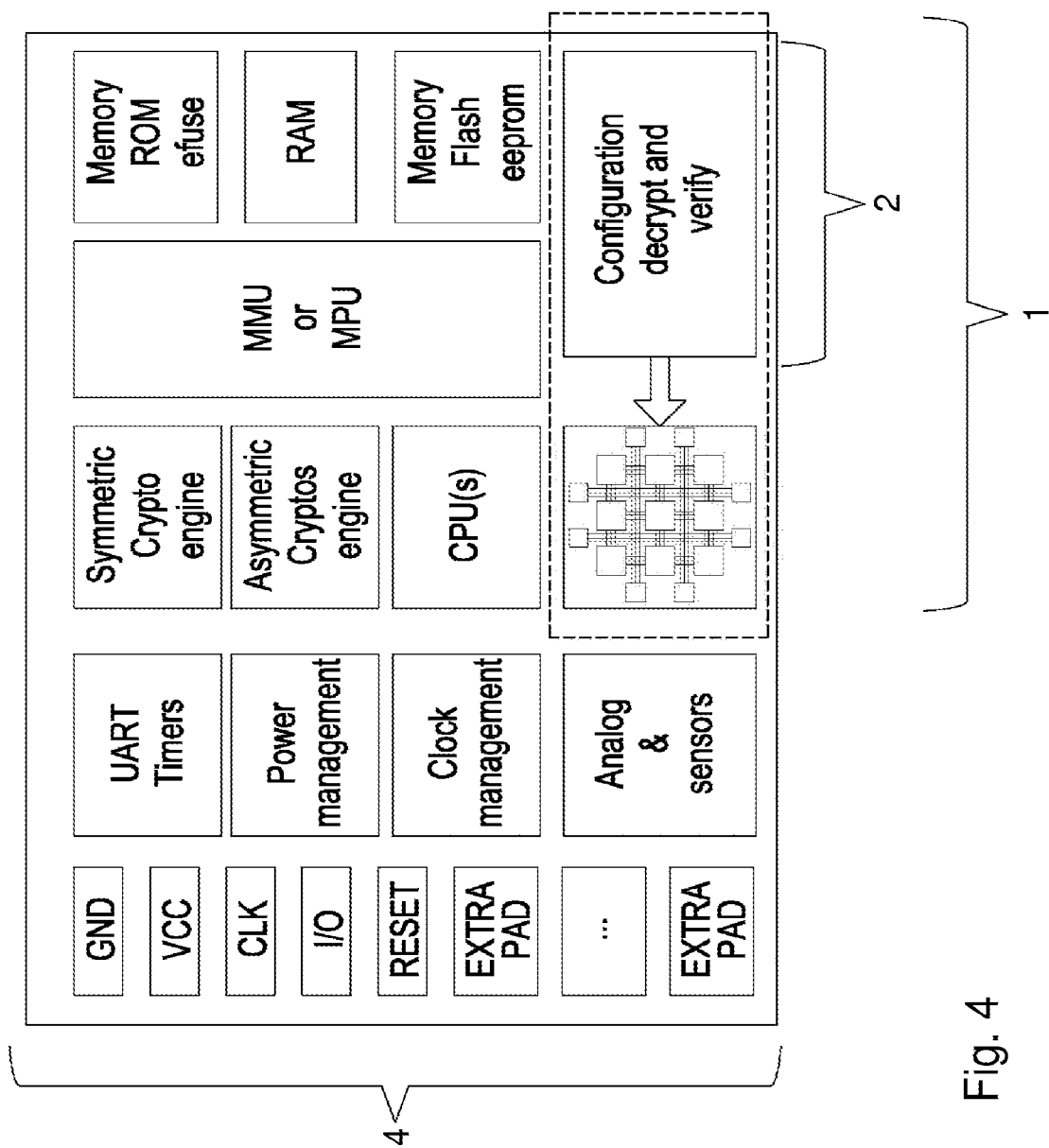
FIG. 4 illustrates a smartcard comprising a programmable device according to an embodiment.

To put the above concept in context, FIG. 4 illustrates a programmable device 1 positioned within a smartcard device 4. As would be understood, various components of a smartcard are shown in FIG. 4. On the left hand side of the Figure are shown the input/output pads (ground, Vcc, clock, i/o data and extra pads) while various functional components are shown as present for illustrative purposes only. A memory management (MMU) or memory protection unit (MPU) is shown for interaction with the various onboard memory (ROM, efuse—a one time programmable ROM, RAM and Flash EEPROM) as would be understood. The other modules are not described herein as their function would be known to the skilled person. A subset of the illustrated functional blocks may be present in further examples. Programmable device 1 may be considered to be a secure element. The power consumption while executing the method as described herein may adhere to smartcard operating parameters, and/or the form factor of the programmable device may adhere to the smartcard parameter standard.

Hence, a smartcard 4 comprising the flexible cryptographic device as described herein and as illustrated in FIG. 4 is capable of bespoke and adaptable voice or video encryption, if, for example, the smartcard resides in a set-top box or other content provider data access control device. Further, flexible cryptographic functionality can be provided to internet-of-things devices or system on-chip (SOC) embedded devices.

A flexible cryptographic device as described herein could be used as part of a conditional access system (CAS), for example residing on a conditional access module (CAM) of a content delivery device.

The configurable modules and/or configurable interconnection(s) of programmable device 1, after undergoing the method described herein can be tailored for individual vendor needs without undergoing a hardware re-design of the silicon.

Accordingly, a method of deploying a secure module, for example a secure element of a programmable device is provided. By allowing aspects of the secure module to be programmed post-manufacture, the design and fabrication of the secure module, and hence the device within which it resides is simplified and hence less costly. The post-manufacture programming capability allows aspects of the cryptographic scheme employed by the secure module to be deployed at or before the time of activation of the device containing the secure module. This reduces the burden on bespoke design of silicon such as secure elements which can reduce time to market as well as allowing segmentation of design and security features between different implementations. Further, by holding back some aspects of the design to the implementation stage, a design level attack would not result in knowing all information required to implement the secure element.

This allows flexibility both in design and manufacture of the secure module in that new devices/PCBs comprising a secure element can be distributed that are of a more generic design allowing reduction in manufacturing cost.

As a result, controlled content providers can take advantage by way of:

1. They can tailor their access control algorithms/keys/codes at will at the point of distribution of the device containing the flexible cryptographic device (for example a secure element).

2. They can change aspects of the secure access control by way of a download to devices post hardware distribution without needing to change hardware in the field. This allows the maintenance of secure access by way of changing secure data that may have become compromised by a successful attack.

Further, as would be understood, owing to the action of the one way function, the configuration data cannot be regenerated in order to enable programing of a blank programmable device. Even if a desired state of the programmable device is obtained post-programming, for example by way of a microscopic attack or by scanning all pins of the programmable device or other device where the programmable device resides, with all possible input combinations, it is not possible to discover the configuration data required to achieve the particular configuration as the one way function prevents this knowledge.

The following embodiments are disclosed:

1. A method of programming a programmable device comprising:
   acquiring configuration data;
   loading the configuration data onto the programmable device;
   processing at least a portion of the configuration data through a one-way function to form processed configuration data; and
   configuring at least one configurable module of the programmable device using the processed configuration data from the processing step.

2. A method according to item 1 or 2 wherein the loading step further comprises deciphering of the configuration data.

3. A method according to any preceding item wherein the loading step further comprises verifying the authenticity and/or integrity of the configuration data by way of an asymmetric key.

4. A method according to item 1 or 2 wherein the loading step further comprises verifying the authenticity and/or integrity of the configuration data by way of a symmetric key.

5. A method according to any preceding item wherein the loading step comprises loading the configuration data onto a configuration module of the programmable device.

6. A method according to item 5 wherein the deciphering and/or verifying is carried out by the configuration module.

7. A method according to any preceding item wherein the processing step is implemented in a processing module of the programmable device.

8. A method according to any preceding item wherein the one way function comprises a hash function.

9. A method according to any preceding item wherein the configuring step comprises a least one of:
   initialising the programmable device;
   configuring a configurable module of the programmable device; and
   configuring an interconnection between modules of the programmable device wherein the modules may be configurable or non-configurable.

10. A method according to any preceding item wherein the at least one configurable module comprises a cryptographic module.

11. A method according to item 10 wherein the cryptographic module comprises at least one of a substitution box module, a substitution table module, a bit permutation module, a byte permutation module, or a matrix multiplication module.

12. A method according to item 10 or 11 wherein the cryptographic module comprises a hardener for a true random number generator or a physically unclonable function, 'PUF'.

13. A method according to any of items 9 to 12 wherein the at least one configurable module comprises a programmable state-machine.

14. A method according to any preceding item wherein the programmable device comprises a secure element.

15. A method according to any preceding item wherein the programmable device is positioned on a smartcard.

16. A method according to any preceding item wherein the power consumption while executing the method adheres to smartcard operating parameters.

17. A method according to any preceding item wherein the form factor of the programmable device adheres to smartcard parameters.

18. A method according to any preceding item wherein any configurable module in the programmable device is configurable.

19. A programmable device arranged to carry out the method according to any preceding item.

20. A programmable device according to item 19 wherein the programmable device comprises a one way function and at least one configurable module.

21. A programmable device according to item 19 or 20 wherein the one way function comprises a hash function.

22. A programmable device according to any of items 19 to 21 wherein the programmable device comprises a configuration module.

23. A programmable device according to any of items 19 to 22 wherein the programmable device comprises a processing module.

24. A programmable device according to any of item 19 to 23 wherein the at least one configurable module comprises a cryptographic module.

25. A programmable device according to item 24 wherein the cryptographic module comprises at least one of a substitution box module, a substitution table module, a bit permutation module, a byte permutation module, or a matrix multiplication module.

26. A programmable device according to item 24 or 25 wherein the cryptographic module comprises a hardener for a true random number generator or a physically unclonable function, 'PUF.

27. A programmable device according to any of items 19 to 26 wherein the at least one configurable module comprises a programmable state-machine.

28. A programmable device according to any of items 19 to 27 wherein the programmable device comprises a secure element.

29. A programmable device according to any of items 19 to 28 wherein the programmable device is positioned on a smartcard.

30. A programmable device according to any of item 19 to 29 wherein the form factor of the programmable device adheres to smartcard parameters.

31. A programmable device according to any of items 19 to 30 wherein the programmable device comprises an FPGA, PLD, CPLD or an anti-fuse device.

It is to be understood that the above description is intended to be illustrative, and not restrictive. Many other implementations will be apparent to those of skill in the art upon reading and understanding the above description. Although the present disclosure has been described with reference to specific example implementations, it will be recognized that the disclosure is not limited to the implementations described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

The invention claimed is:

1. A method of programming a programmable device, the method comprising:
acquiring configuration data;
loading the configuration data onto the programmable device;
processing at least a portion of the configuration data through a one-way function to form processed configuration data; and
configuring a configurable module of a plurality of configurable modules of the programmable device using the processed configuration data from the processing step, wherein the configurable module includes a cryptographic module, the cryptographic module includes a physically unclonable function (PUF), and the plurality of configurable modules are arranged in an interconnected matrix and interconnected by a plurality of connections, wherein the configuring comprises modifying at least one of the plurality of connections.

2. The method according to claim 1, wherein the loading step further comprises deciphering of the configuration data.

3. The method according to claim 2, wherein the deciphering is performed by the configuration module.

4. The method according to claim 1, wherein the loading step further comprises verifying authenticity and/or integrity of the configuration data by way of a symmetric key or an asymmetric key.

5. The method according to claim 1, wherein the loading step comprises loading the configuration data onto a configuration module of the programmable device.

6. The method according to claim 1, wherein the configuring step comprises a least one of:
initializing the programmable device; and
configuring an interconnection between modules of the programmable device, wherein the modules may be configurable or non-configurable.

7. The method according to claim 1, wherein power consumption while executing the method adheres to smartcard operating parameters.

8. A programmable device, comprising:
circuitry configured to
acquire configuration data and load the configuration data to a memory of the programmable device;
process at least a portion of the configuration data through a one-way function to form processed configuration data; and
configure a configurable module of a plurality of configurable modules of the programmable deice using the processed configuration data, wherein the configurable module includes a cryptographic module, the cryptographic module includes a physically unclonable function (PUF), and the plurality of configurable modules are arranged in an interconnected matrix and interconnected by a plurality of connections, wherein, in the configuring, the circuitry is configured to modify at least one of the plurality of connections.

9. The programmable device according to claim 8, wherein the programmable device comprises the one way function.

10. The programmable device according to claim 8, wherein the cryptographic module comprises at least one of a substitution box module, a substitution table module, a bit permutation module, a byte permutation module, or a matrix multiplication module.

11. The programmable device according to claim 8, wherein the configurable module includes a programmable state-machine.

12. The programmable device according to claim 8, wherein the programmable device is positioned on a smartcard.

13. The programmable device according to claim 8, wherein a form factor of the programmable device adheres to smartcard parameters.

* * * * *